United States Patent
Syamoto

(10) Patent No.: US 6,301,994 B1
(45) Date of Patent: Oct. 16, 2001

(54) SHIFT LEVER APPARATUS

(75) Inventor: Noriyasu Syamoto, Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/362,036

(22) Filed: Jul. 28, 1999

(30) Foreign Application Priority Data

Jul. 30, 1998 (JP) .................................................. 10-216062

(51) Int. Cl.$^7$ .................................................. B60K 20/04
(52) U.S. Cl. ................ 74/538; 74/527; 74/473.3
(58) Field of Search ...................... 74/527, 538, 523, 74/473.3, 473.1, 473.23, 473.25

(56) References Cited

U.S. PATENT DOCUMENTS

| | | | |
|---|---|---|---|
| 5,582,073 | * | 12/1996 | Takeuchi et al. .................. 74/538 X |
| 5,596,909 | * | 1/1997 | Cox et al. .......................... 74/538 X |
| 6,038,939 | * | 3/2000 | Wheller .............................. 74/473.3 |

FOREIGN PATENT DOCUMENTS 60-126815    8/1985    (JP) .

* cited by examiner

Primary Examiner—Mary Ann Green
(74) Attorney, Agent, or Firm—Nixon Peabody LLP; Thomas W. Cole

(57) ABSTRACT

Detent protrusions 66 disposed at a detent rod 60 of a shift lever 40 are molded so as to be integrated with the detent rod 60 in such a manner that the cross section of a portion of each of the detent protrusions 66 connected to the detent rod 60, taken along a direction substantially intersecting the direction in which each of the detent protrusions 66 protrudes, is larger, as compared to cross sections of other portions of the detent protrusion 66, than the portion of the detent protrusion 66 connected to the detent rod 60. As a result, even when the detent protrusions 66 and the detent rod 60 are molded from a synthetic resin so as to be integrated with each other, the detent protrusion 66 ensures the same strength as a conventional detent pin is achieved.

6 Claims, 6 Drawing Sheets

SHIFT LEVER APPARATUS

BACKGROUND OF THE INVENTION

1. Field of the Invention

The present invention relates to a shift lever apparatus for changing a shift range on a vehicle transmission.

2. Description of the Related Art

An example of a shift lever apparatus for changing a shift range on an automatic transmission for a vehicle is disclosed in Japanese Utility Model Application Laid-Open (JP-U) No. 60-126815. In a shift lever of the shift lever apparatus in this disclosure, each of the components is integrally molded using a material in which a thermoplastic synthetic resin is impregnated with glass fibers so as to form the shift lever. Accordingly, this shift lever, being different from a conventional shift lever which has been formed by welding a plurality of metal components or by fastening the components with bolts, is made more compact and lightened. In addition, although this shift lever is molded from a synthetic resin, as it contains glass fibers, it has a high degree of strength.

An ordinary shift lever apparatus comprises a restricting means for restricting an unexpected shift operation from a predetermined shift position (e.g., a shift position corresponding to a reverse range for driving the vehicle driving wheel in reverse) to another shift position (e.g., a shift position corresponding to a parking range for locking the vehicle driving wheel).

This type of restricting means has a detent rod which is accommodated inside the shift lever, which is urged toward a tip end of the shift lever by an urging means such as a compression coil spring, and which can move therein along an urging direction of the urging means and along a direction opposite to the urging direction. Detent pins are formed at an outer peripheral portion of this detent rod so as to protrude therefrom, then penetrate through slit holes or the like which are formed at an outer peripheral portion of the shift lever, and protrude therefrom. On the other hand, side walls, that stand upright from a base member which supports the shift lever, are disposed at the sides of the shift lever. A tip end portion of each of the aforementioned detent pins enters into a detent hole which is formed in the side walls.

As described above, as the detent rod is urged by the urging means, the detent pin normally abuts an inner peripheral portion of the detent hole in a direction in which the urging force of the urging means acts. A wall portion is formed at a portion of the inner peripheral portion of the detent hole in a direction opposite to the direction in which the urging force of the urging means acts. Namely, when the shift lever is located at the aforementioned predetermined position, the detent pins and the wall portion face each other along a rotating direction of the shift lever, and the wall portion restricts the rotational operation of the shift lever to another shift position through the detent pins and the detent rod. When the detent rod is moved so as to oppose the urging force of the urging means by pressing a button provided at a knob or the like, the detent pins are caused to disengage from the wall portion, and a rotational operation of the shift lever to another shift position can be performed.

The strength of the detent pin on its own and the strength obtained through the connection of the detent pin and the detent rod must ensure a strength which is greater than or equal to a level of strength which is able to resist an impact load of the detent pin on abutting against the wall portion of the detent hole during the rotational operation of the shift lever, and for this reason, generally, the detent pin and the detent rod have been formed by welding metal components.

The shift lever of the shift lever apparatus in the Japanese Utility Model Application Laid-Open (JP-U) No. 60-126815 has also been formed in the same manner as this. Namely, since the shift lever has been formed by connecting a metal detent pin to a metal detent rod by welding, from a viewpoint of making the shift lever more compact, there has been room for improvement.

SUMMARY OF THE INVENTION

In view of the aforementioned facts, it is an object of the present invention to provide a shift lever apparatus having a shift lever capable of ensuring the necessary strength, being manufactured in a simple manner, and being made compact as a whole.

The first aspect of the present invention is a shift lever apparatus which selects an arbitrary shift range from a plurality of shift ranges set on a vehicle transmission and changes into the selected shift range due to a rotational operation of a shift lever connected to the vehicle transmission, comprising: a detent rod which is displaced in the rotating direction of the shift lever in accordance with the rotational operation of the shift lever, is disposed inside the shift lever so as to be able to carry out a reciprocating motion to the shift lever, and is urged in one direction of the reciprocating motion; a detent portion which is molded so as to be integrated with the detent rod, is extended from an outer peripheral portion of the detent rod so as to protrude outwardly from the shift lever, and in which the cross section of a portion of the detent portion connected to the detent rod in a direction substantially intersecting an extending direction of the detent portion is greater than the cross section in the direction substantially intersecting the extending direction of the detent portion, of a side end portion of the detent portion in the extending direction; and a detent means which is formed so as to face the detent portion in a direction in which the detent portion moves in accordance with the rotational operation of the shift lever, which restricts the rotational operation of the shift lever indirectly by engaging with the detent portion when the rotational operation of the shift lever from a predetermined shift position is performed, and which is able to release the state in which the rotational operation of the shift lever has been restricted by a movement of the detent rod in opposition to the urging force thereof.

According to the shift lever apparatus having the above-described structure, when the rotational operation of the shift lever is performed, the shift range set in the vehicle transmission is changed into the shift range corresponding to the rotated position of the shift lever.

When the operation to rotate the shift lever to the rotated position corresponding to a specific shift range is performed, the detent portion which is extended from the detent rod engages with the detent means along the rotating direction of the shift lever, and the rotational operation of the shift lever is restricted indirectly by the detent means. At this time, when the detent rod inside the shift lever is caused to move so as to oppose the urging force, the detent portion which is integrated with the detent rod moves in accordance with the aforementioned movement, the state in which the detent means and the inner peripheral portion of the detent hole have been facing each other is released so that the restriction on the movement of the detent portion can be released.

In the shift lever apparatus of the present invention, since the detent rod and the detent portion are previously molded so as to be integrated with each other, through molding such as injection molding, cast molding, or the like, the number of components used for the shift lever apparatus as a whole is reduced, and a process for assembling the detent rod and the detent portion together becomes unnecessary so that the number of manufacturing processes is reduced. Further, the apparatus can be made compact. Moreover, the cross section of a portion of the detent portion connected to the detent rod is greater than the end portion of the detent portion in the extending direction thereof. As a result, the detent portion can ensure a strength level which is able to resist the impact when abutting the inner peripheral portion of the detent hole.

DETAILED DESCRIPTION OF THE PREFERRED EMBODIMENTS

Figure 4:
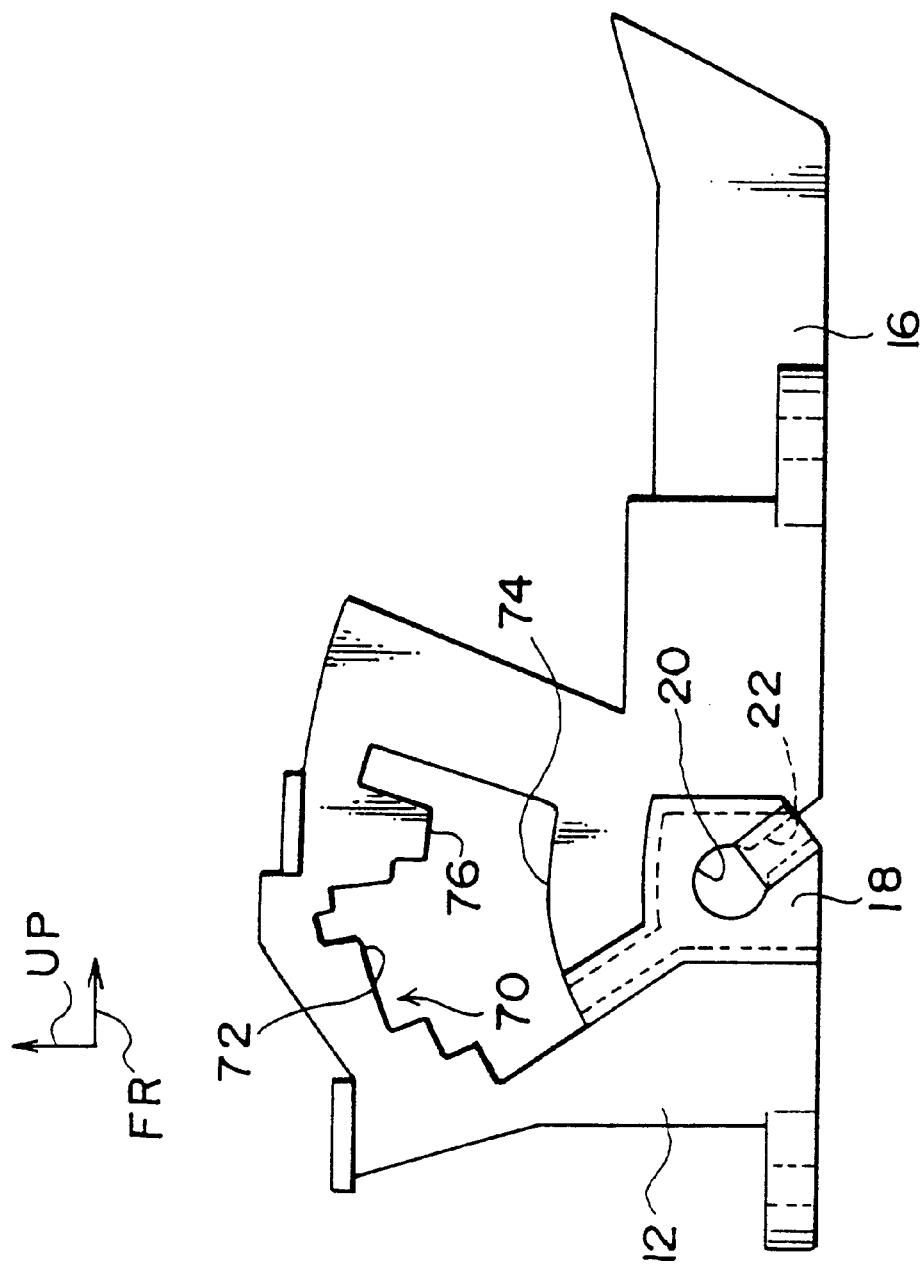
FIG. 4 is a side view of a base member applied in the shift lever apparatus according to the present embodiment.
Figure 5:
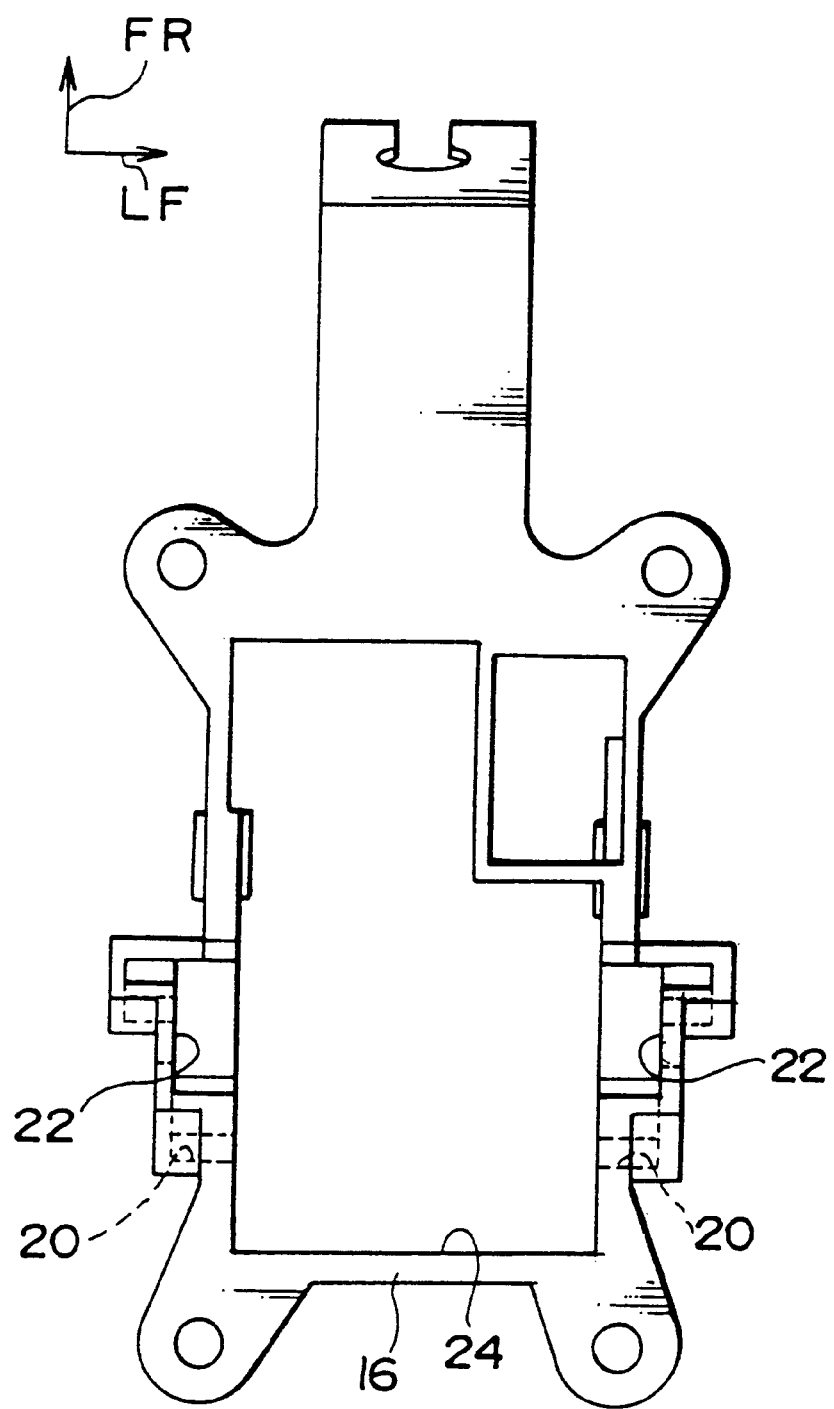
FIG. 5 is a bottom view of the base member applied in the shift lever apparatus according to the present embodiment.
Figure 6:
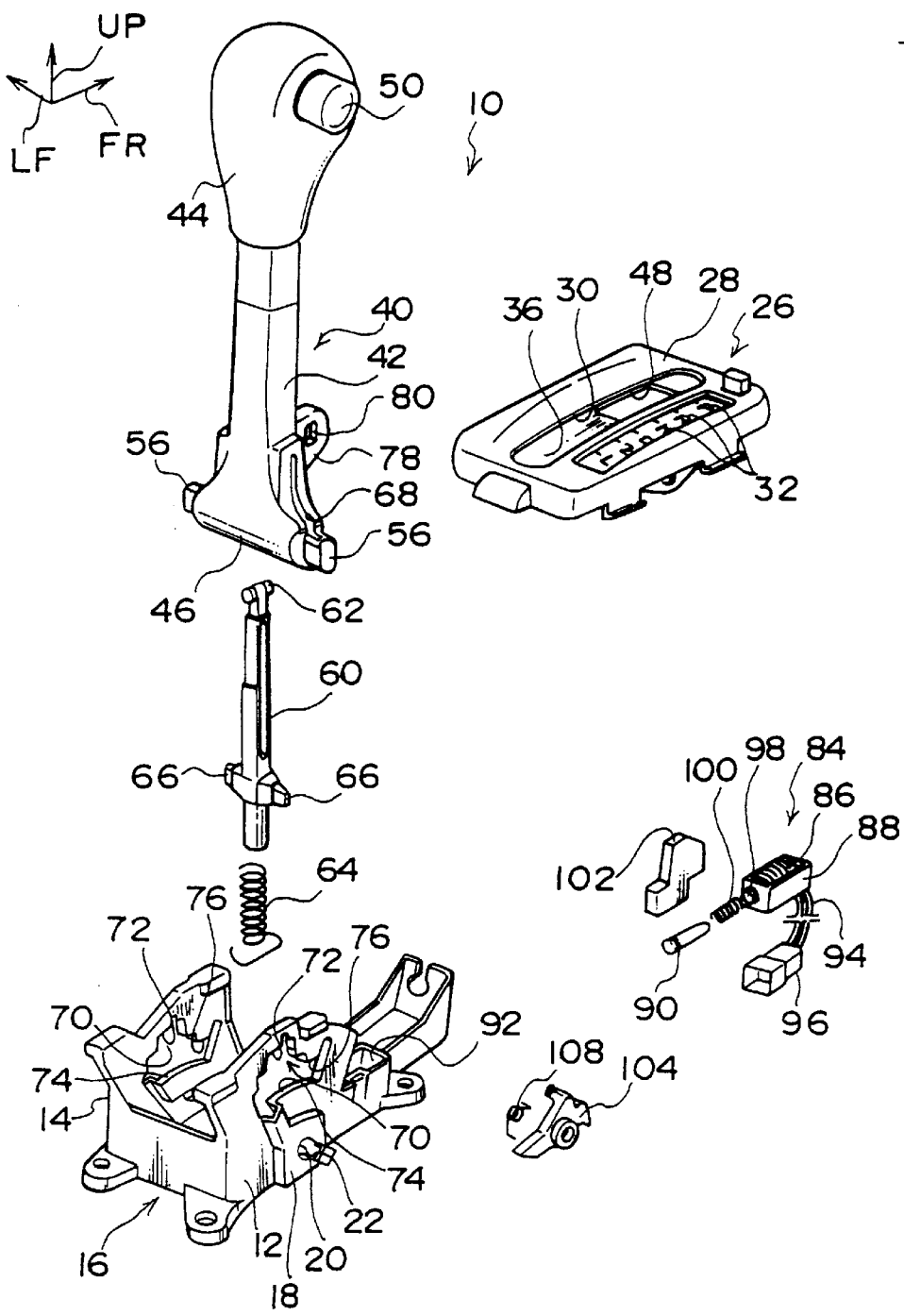
FIG. 6 is an exploded perspective view of the shift lever apparatus according to the present embodiment.

FIG. 6 shows an exploded perspective view of a shift lever apparatus 10 according to an embodiment of the present invention. As is shown in this figure, the shift lever apparatus 10 has a plate-shaped base member 16. A pair of side walls 12 and 14 serving as supporting members are disposed standing upright from both end portions of the base member 16 in a substantially transverse direction of the vehicle (the direction of the arrow LF and the direction opposite to the direction of the arrow LF in FIG. 6). Substantially U-shaped shaft receiving portions 18, a bottom wall portion of each of which is disposed outside each of the side walls 12 and 14 in the substantially vehicle transverse direction, are formed at the side walls 12 and 14, respectively. As is shown in FIG. 4, a circular shaft receiving hole 20 is formed at the bottom wall portion of each of the shaft receiving portions 18. Further, a notched portion 22 whose width is sufficiently smaller than the internal diameter of the shaft receiving hole 20 is formed at each of the bottom wall portions of the shaft receiving portions 18. One end of each of these notched portions 22 is connected to each of the shaft receiving holes 20, and the other end is connected to a rectangular opening portion 24 (see FIG. 5) which is formed on the base member 16 through wall portions of the shaft receiving portions 18.

As is shown in FIG. 6, a housing 26 is disposed at the base member 16 in a substantially upper direction of the vehicle. The housing 26 is formed in a substantially box shape which has a shallow bottom and is open substantially toward the bottom of the vehicle, and at a ceiling portion 28 of the housing 26 is formed a guide hole 30 whose lengthwise direction corresponds to the substantially vehicle longitudinal direction. Further, a plurality of letters 32 are formed beside and along the guide hole 30 in a substantially right-hand direction of the vehicle. Each of these letters 32 corresponds to each of a plurality of shift ranges set in an unillustrated automatic transmission, wherein a letter "P" 32 represents a parking range for locking a vehicle driving wheel (not shown) and a letter "R" 32 represents a reverse range for driving the vehicle driving wheel in reverse, and a letter "N" 32 represents a neutral range for setting the vehicle driving wheel in a state in which it is able to rotate freely.

Guide rails (not shown) are formed along both sides of the guide hole 30 in a widthwise direction thereof on the rear surface side (i.e., inside) of the ceiling portion 28, and a thin plate-shaped cover plate 36 is thereby supported by these guide rails so as to be able to slide in the substantially vehicle longitudinal direction.

Figure 1:
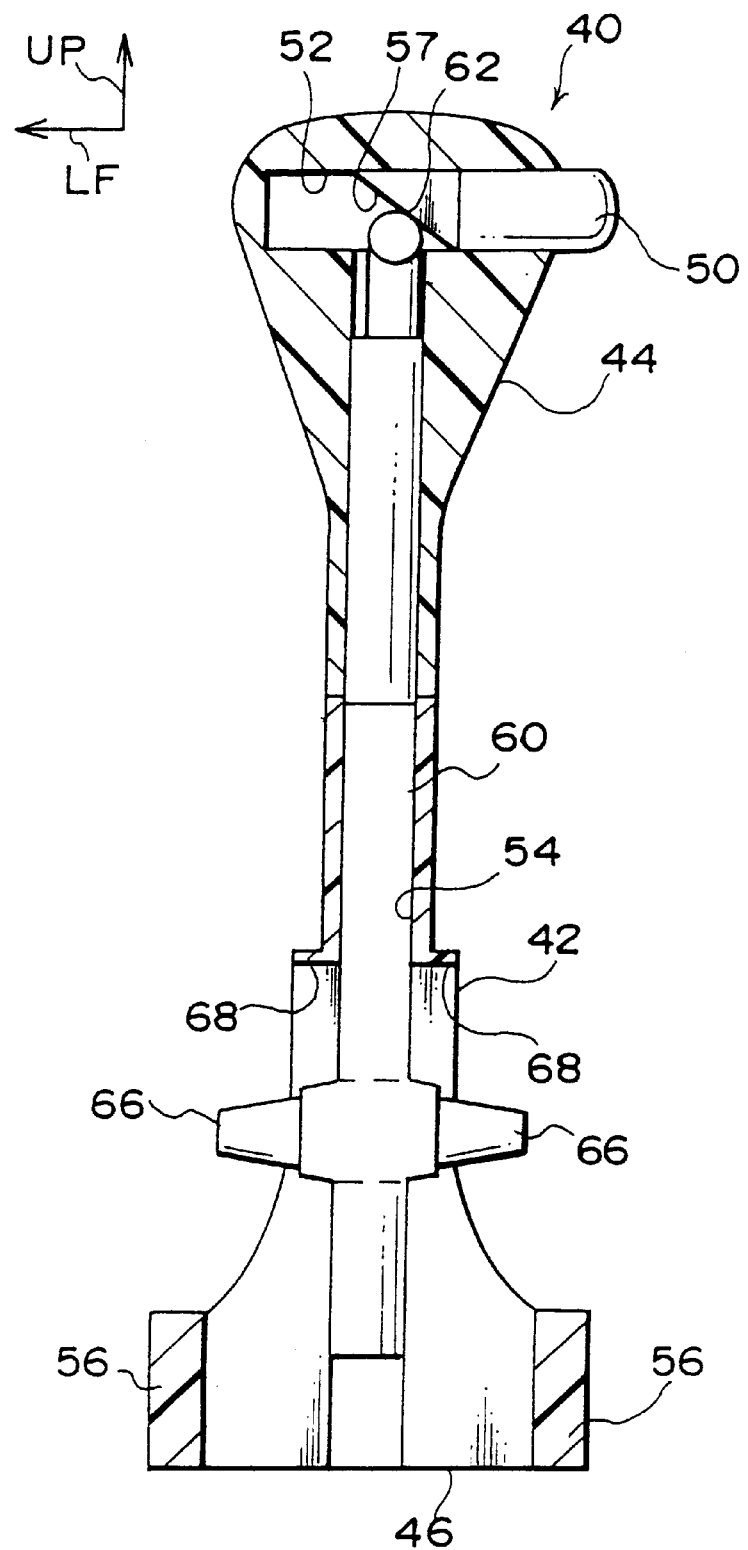
FIG. 1 is a front cross-sectional view of a shift lever applied in a shift lever apparatus according to an embodiment of the present invention.
Figure 2:
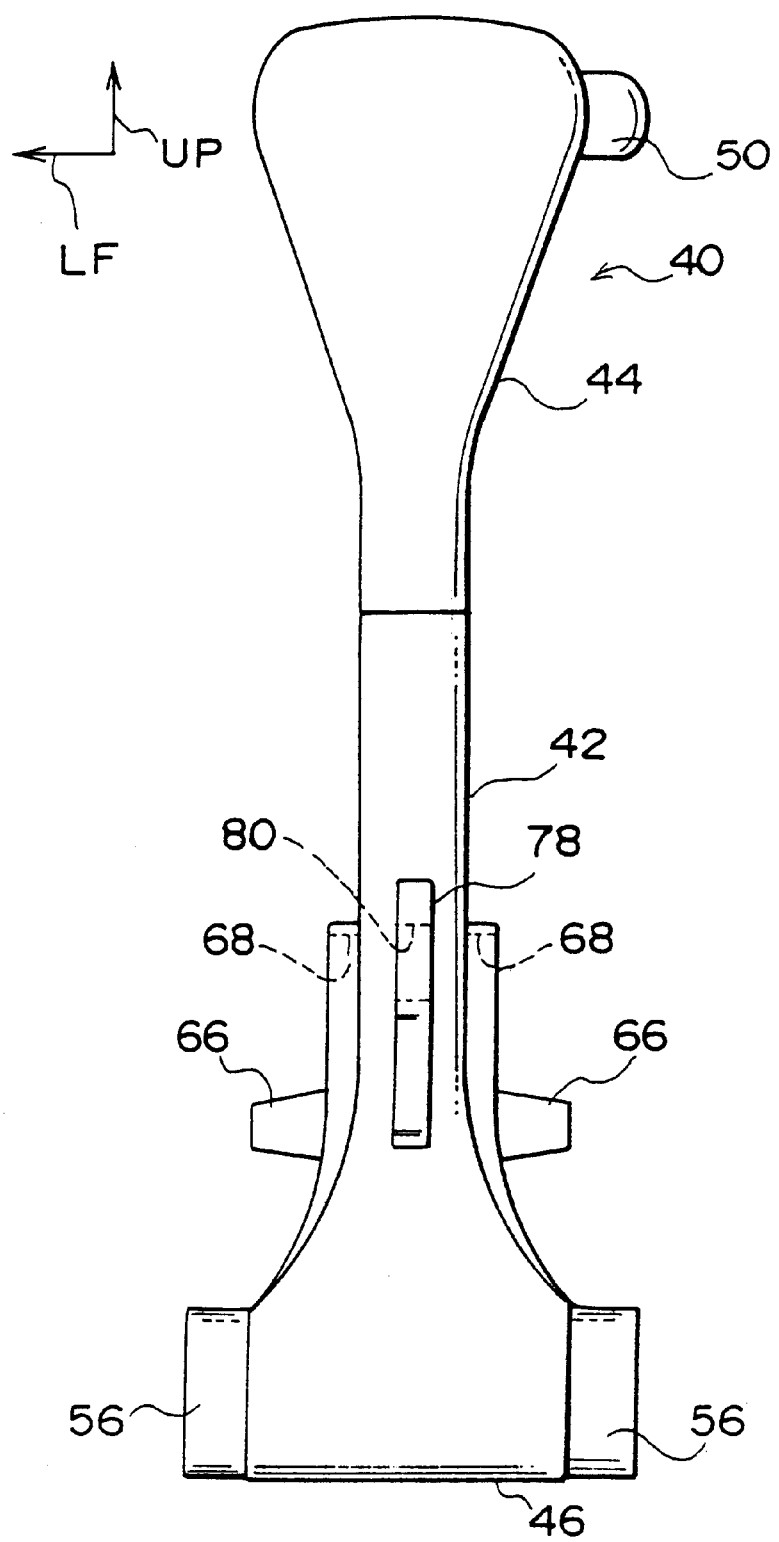
FIG. 2 is a front view of an external view of the shift lever applied in the shift lever apparatus according to the present embodiment.
Figure 3:
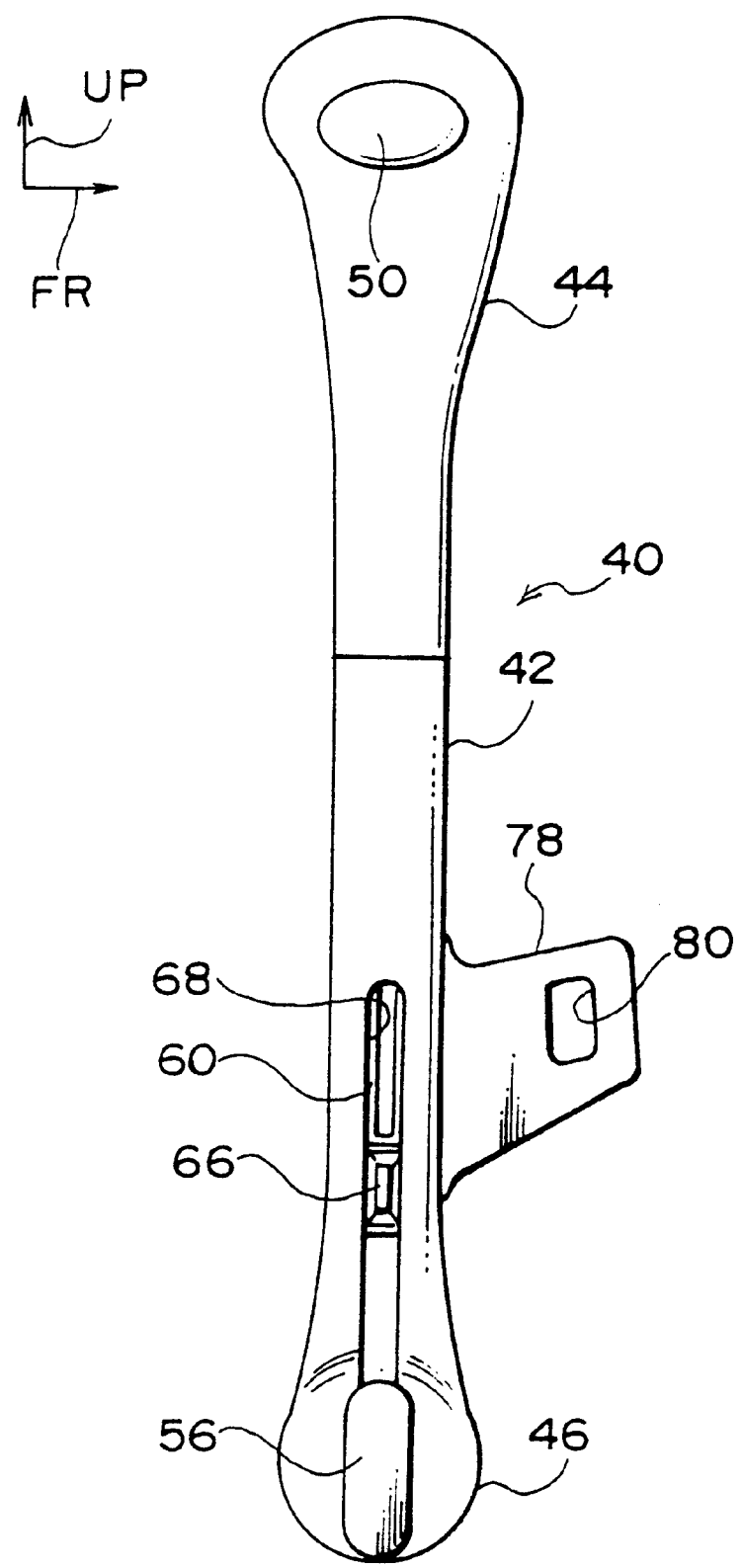
FIG. 3 is a side view of an external view of the shift lever applied in the shift lever apparatus according to the present embodiment.

A shift lever 40 is supported by the above-described shaft receiving holes 20 so as to rotate freely. A front view of the shift lever 40 is shown in FIG. 2, and a side view thereof is shown in FIG. 3. Further, a front cross-sectional view of the internal structure of the shift lever 40 is shown in FIG. 1.

This shift lever 40 comprises a substantially square bars-shaped lever body 42 whose lengthwise direction corresponds to the substantially vertical direction of the vehicle, a knob 44 as an operational grip, and a connecting portion 46 which is a connected portion to the side walls 12 and 14.

Each of the components is integrally molded using a synthetic resin so as to form the lever body 42 through a method such as injection molding. The upper end side of the lever body 42 passes through the guide hole 30 of the aforementioned housing 26, and a rectangular through hole 48 formed in the cover plate 36, so as to extend upwardly from the housing 26.

The knob 44 is secured to the upper end portion of the lever body 42, and a release button 50 is mounted to the side end portion of the knob 44 on the substantially right-hand side of the vehicle. As is shown in FIG. 1, a transverse hole portion 52 which is open at the side end portion of the knob 44 on the substantially right-hand side of the vehicle is formed in the knob 44. The side of the aforementioned release button 50 on the substantially left-hand side of the vehicle enters the inside of the transverse hole portion 52, and is able to move transversely along the transverse hole portion 52. Further, a cam portion 57 is formed at the side end portion of the release button 50 on the substantially left-hand side of the vehicle. The cam portion 57 has an inclining end surface whose height gradually decreases to the left.

A connecting portion 46 is molded from a synthetic resin so as to be integrally connected to the lower end side of the lever body 42. As is shown in FIG. 3, the connecting portion 46 has a thickness that is almost the same as the lever body 42. However, as is shown in FIG. 2, when viewed from the front, the connecting portion 46 is formed in a (divergent) triangle whose width gradually increases toward the bottom. Further, shafts 56 are formed so as to protrude from the lower end portion of the connecting portion 46 along the substantially vehicle transverse direction. As is shown in FIG. 1, the cross section of each of the shafts 56 is different from that of a shaft of a conventional shift lever which is formed in a solid or hollow cylindrical shape, and is formed in a substantially oval shape (in which parallel portions are formed) by taking two (parallel) arc portions facing each other away from the cylindrical shape of the conventional shaft. The diameter of the arc-shaped portions of each shaft 56 is slightly smaller than the internal diameter of each of the aforementioned shaft receiving holes 20. When each of the shafts 56 is fitted into each of the shaft receiving holes 20, although movement of the shaft 56 in a radial direction is restricted by an inner circumferential portion of the shaft receiving hole 20, the shaft 56 rotates freely in an axial direction. Namely, each shaft 56 is fitted into each shaft receiving hole 20, and the lever body 42 (shaft lever 40) is thereby supported by the shaft receiving portions 18 so as to rotate freely. On the other hand, the width between the parallel portions of the substantially oval-shape of the shaft 56 is slightly smaller than that of each of the notched portions 22. Accordingly, it is possible to pass the shaft 56 through the notched portion 22 by corresponding the widthwise direction of the notched portion 22 to that of the shaft 56. A portion of the notched portion 22 communicating with the shaft receiving hole 20 is structured such that the notched portion 22, and the parallel portions of the shaft 56 do not correspond to each other neither at a shift position at which the shift lever 40 corresponds to each of the plurality of shift ranges set on an automatic transmission (not shown) nor at a rotating position of the shift lever 40 among these shift positions. As a result, a shift operation (rotational operation) of the assembled shift lever 40 does not allow the shaft 56 to enter into the notched portion 22 or escape therefrom.

As is shown in FIG. 1, a longitudinal hole portion 54 whose upper end portion communicates with the aforementioned transverse hole portion 52 is formed in the connecting portion 46, the lever body 42, and the knob 44 along the lengthwise direction of the lever body 42. A bar-shaped detent rod 60 whose lengthwise direction corresponds to the substantially vehicle longitudinal direction is inserted into the longitudinal hole portion 54. The detent rod 60 is a bar-shaped member in which each of the elements is molded from a synthetic resin so as to form an integrated body by a method such as injection molding or the like, and a cylindrical portion 62 whose axial direction corresponds to the substantially vehicle longitudinal direction (the direction of the arrow FR and the direction opposite to the direction of the arrow FR in FIG. 6) is formed at the upper end portion of the detent rod 60, and contacts linearly with the end surface of the aforementioned cam portion 57. Accordingly, when the release button 50 in a protruding state from the transverse hole portion 52 is pressed and is moved to the left, the cam portion 57 pushes the cylindrical portion 62 downwards so as to slide the detent rod 60 downwards.

As is shown in FIG. 6, a compression coil spring 64 is provided in the vicinity of the lower end portion of the detent rod 60. One end of the compression coil spring 64 is anchored at the aforementioned base member 16 or the side walls 12 and 14, and the other end engages with the detent rod 60 so as to urge the detent rod 60 upwards all the time. Accordingly, when the release button 50 is pressed so as to slide the detent rod 60 downwards, a pressing operation thereof is performed so as to oppose the urging force from the compression coil spring 64. Further, as is shown in FIG. 1, detent protrusions 66, serving as a detent portion, are formed in the substantially vehicle transverse direction so as to protrude from the intermediate portion of the detent rod 60 in the lengthwise direction thereof. Each of the detent protrusions 66 is formed in a trapezoidal shape which tapers towards the tip end portion in the protruding direction of the detent protrusion 66 when viewed from the front and the plane. The cross section of the detent protrusion 66, which is taken along a direction intersecting the protruding direction, gradually decreases toward the tip end portion of the detent protrusion 66 (in other words, the cross section of the detent protrusion 66 is at maximum at the portion where the detent protrusion 66 is connected to the detent rod 60).

Slit holes 68 are formed at the lower end side of the intermediate portion of the lever body 42 and the connecting portion 46 in the lengthwise direction thereof so as to correspond to these detent protrusions 66. The lengthwise direction of the slit holes 68 corresponds to the substantially vertical direction of the vehicle, and is open toward the substantially left-hand side of the vehicle and the substantially right-hand side of the vehicle. These slit holes 68 communicate with the longitudinal hole portion 54 so that the detent protrusions 66 penetrate through the slit holes 68, protrude outwardly from the lever body 42, and thereby enter into the detent holes 70 which are formed respectively at the side walls 12 and 14. Accordingly, a shift operation of the shift lever 40 is restricted to within a range bounded by each of the detent holes 70. In addition, as described above, since the detent rod 60 is always urged upwardly by the compression coil spring 64, each of the detent protrusions 66 basically abuts the upper side inner peripheral portion 72 of the detent hole 70, and in which state, rotates around the shaft 56 in accordance with the shift operation of the shift lever 40. Further, a restricting portion 76 as a detent means is formed at a portion of the upper side inner peripheral portion 72 of the detent hole 70 so as to protrude therefrom towards the lower side inner peripheral portion 74 thereof. When the shift lever 40 is rotated from a predetermined shift position in a state in which each of the detent protrusions 66 is located at the upper end side of each of the slit holes 68, the restricting portion 76 abuts the detent protrusion 66 along a rotating direction of the shift lever 40, and thereby restricts the shift operation of the shift lever 40 indirectly.

As is shown in FIG. 3, an engagement plate 78 is disposed at an intermediate portion of the lever body 42 in the lengthwise direction thereof. A through hole 80, which penetrates through the engagement plate 78 in the substantially vehicle transverse direction, is formed in the engagement plate 78. One end of a wire (not shown) is engaged with the engagement plate 78 in a state in which the wire penetrates through the through hole 80. The other end of the wire is mechanically connected to the automatic transmission. When the shift lever 40 is operated (in rotation) around the shafts 56 towards a position beside any one of the above-described letters 32, for example, a rotated position of the shift lever 40 beside the letter P 32 corresponding to a parking range (whose shift position is referred to as P position for convenience hereinafter) or a rotated position beside the letter N 32 corresponding to a neutral range (whose shift position is referred to as N position for convenience hereinafter), the engagement plate 78 rotates together with the shift lever 40, and the wire changes the automatic transmission into a shift range corresponding to the letter 32.

During a shift operation of the shift lever 40 from N position to P position and from P position to N position, the detent protrusions 66 abut the restricting portion 76.

As is shown in FIG. 6, the shift lever apparatus 10 has a shift lock solenoid 84. The shift lock solenoid 84 is structured by a solenoid body 88 having a coil 86 or a core (not shown) accommodated therein, and a bar-shaped plunger 90. The solenoid body 88 is mounted to a solenoid accommodating portion 92 disposed inside the side wall 12 of the base member 16 by being inserted into the solenoid accommodating portion 92, and is electrically connected to a shift lock computer (not shown) via a connecting means such as a lead 94, a connector 96, or the like. Further, a through hole 98 is formed in the solenoid body 88, which opens towards the substantially rearward direction of the vehicle, into which the plunger 90 is inserted so as to be slidable in the substantially vehicle longitudinal direction. The shift lock computer energizes the coil 86 so as to magnetize the core, and the plunger 90 is thereby attracted to the inside the solenoid body 88.

A compression coil spring 100 is disposed beside the solenoid body 88 in the substantially rearward direction of the vehicle and urges the plunger 90 in the substantially vehicle rearward direction. Accordingly, while the coil 86 is not being energized, the plunger 90 for the most part protrudes outwardly from the solenoid body 88 due to the urging force of the compression coil spring 100. Further, as is shown in FIG. 6, a shift lock plate 102 is disposed at the shift lock solenoid 84 in the substantially vehicle rearward direction and beside the side wall 14 so as to be slidable in the substantially vehicle longitudinal direction.

The shift lock plate 102 is a plate-shaped member whose thickness direction corresponds to the substantially vehicle transverse direction, and the end portion thereof in the substantially vehicle frontward is connected to the above-described plunger 90. Accordingly, when the plunger 90 slides along the substantially vehicle longitudinal direction due to the urging force of the compression coil spring 100 and the attraction of the magnetized core, the shift lock plate 102 thereby slides integrally with the plunger 90 and, in the state in which the plunger 90 protrudes from the solenoid body 84 due to the urging force of the compression coil spring 100, a portion of the shift lock plate 102 in the substantially vehicle rearward is positioned beside the restricting portion 76 of the detent hole 70.

The upper portion of a portion of the shift lock plate 102 in the substantially vehicle rearward direction is positioned substantially at the same position as the lower end portion of the restricting portion 76 or above the lower end portion of the restricting portion 76. Accordingly, in this state, when the release button 50 of the knob 44 is pressed and the detent rod 60 is thereby moved downwardly, the shift lock plate 102 and the detent protrusions 66 face each other in the rotating direction of the shift lever 40. Further, in the case in which the shift lever 40 moves to a shift position corresponding to the parking range, and the detent protrusions 66 are positioned to the substantially vehicle frontward direction of the restricting portion 76, each of the detent protrusions 66 and the shift lock plate 102 thereby face each other along the lengthwise direction of the shift lever 40 (lever body 42). In this state, if an attempt is made to lower the detent rod 60 by pressing the release button 50 of the knob 44, because each of the detent protrusions 66 abuts the upper end portion of the shift lock plate 102 before they slide to the downward of the restricting portion 76, the detent protrusions 66 cannot dodge the restricting portion 76 thus making it impossible to rotate the shift lever 40 substantially toward the rear of the vehicle.

Conversely, as is shown in FIG. 6, a key interlock cam 104 is supported by the side wall 14 outside the side wall 14 so as to rotate freely. A torsion coil spring 108 whose urging force is smaller than that of the above-described compression coil spring 64 is disposed between this key interlock cam 104 and the side wall 14. One end of the torsion coil spring 108 is fixed to the side wall 14 and the other end is fixed to the key interlock cam 104. Accordingly, in a state in which an external force other than the urging force of the torsion coil spring 108 is not being applied to the key interlock cam 104, the key interlock cam 104 is held at a predetermined rotating position. At this predetermined rotating position, a portion of the key interlock cam 104 in the substantially vehicle rearward direction and a portion of the detent hole 70 in the substantially vehicle forward direction of the restricting portion 76 overlap each other in the substantially vehicle transverse direction. As a result, when the detent protrusions 66 are positioned at the portion of the detent hole 70 in the substantially vehicle forward direction of the restricting portion 76, the detent protrusions 66 and the key interlock cam 104 face each other in the substantially vertical direction of the vehicle. Further, when the detent protrusions 66 slide toward the upper inner peripheral portion 72 of the detent hole 70 due to the urging force of the compression coil spring 64, the detent protrusions 66 oppose the urging force of the torsion coil spring 108, lift the key interlock cam 104, and thereby rotate the key interlock cam 104.

The key interlock cam 104 is mechanically connected to a key cylinder of a key device via the wire (none of which are shown). When the key interlock cam 104 is located at the above-described predetermined position (in other words, when the shift lever 40 is located at any other shift position than a shift position corresponding to the parking range), the key interlock cam 104 restricts the escape of the ignition key that has been inserted into the key cylinder (not shown), from this key cylinder. Conversely, when the key interlock cam 104 is rotated by being pressed by the detent protrusions 66 so as to oppose the urging force of the torsion coil spring 108 (in other words, when the shift lever 40 is located at the shift position corresponding to the parking range), the key interlock cam 104 releases the restriction of the escape of the ignition key from the key cylinder.

The operation and effects of the present embodiment will be explained hereinafter.

In the shift lever apparatus 10 of the present invention, when the shift lever 40 is operated so as to rotate around the shafts 56 to beside any one of the letters 32, the automatic transmission (not shown) is operated through the wire and changed into a shift range corresponding to the letter 32 beside the shift lever 40. However, if an attempt is made to perform a shift operation of the shift lever 40 from a position N to a position P, since the detent protrusions 66 and the restricting portion 76 of the detent hole 70 face each other along the rotating direction of the shift lever 40, it is impossible to perform the shift operation of the shift lever 40 in that state as it is. A pressing operation is performed on the release button 50 of the knob 44, the detent rod 60 is caused to slide downward, and the detent protrusions 66 are moved to below the restricting portion 76 so that the detent protrusions 66 can thereby dodge the restricting portion 76. At this time, the detent protrusions 66 and the shift lock plate 102 face each other along the rotating direction of the shift lever 40, and when the shift operation of the shift lever 40 is performed as it is, the detent protrusions 66 abut the shift lock plate 102, however, when the shift lever 40 is caused to rotate, if the pressing force applied by the detent protrusions 66 to the shift lock plate 102 is greater than the urging force of the compression coil spring 100, the shift lock plate 102 is forcibly displaced so that the shift lever 40 can perform the shift operation to the position P. Thereafter, if the pressing force applied to the release button 50 is released, the detent rod 60 is caused to slide upwardly due to the urging force of the compression coil spring 64 so that detent protrusions 66 are raised until they abut the upper inner peripheral portion 72 of the detent hole 70. As a result, the shift lock plate 102, in which the pressing force that is applied from the detent protrusions 66 thereto has been released, returns to a position before it is pressed by the urging force of the compression coil spring 100.

Meanwhile, in order for the shift lever 40 to perform the shift operation from the position P to the position N, when the detent protrusions 66 are moved downwardly by the release button 50 being pressed, the detent protrusions 66 abut the upper end portion of the shift lock plate 102. In this state, because the detent protrusions 66 cannot move downwardly to a position at which they can dodge the restricting portion 76, the shift lever 40, as a result, cannot perform the shift operation to the position N. In this state, for example, when the shift lock solenoid 84 is energized so as to magnetize the core by the action of stepping on a brake pedal for a vehicle (not shown), the plunger 90 is attracted to the core and then withdrawn to the inside of the solenoid body 84. Accordingly, since the shift lock plate 102 is displaced substantially toward the front of the vehicle, when the release button 50 is pressed, the detent protrusions 66 can be moved downwardly to a position where they can dodge the restricting portion 76 so that the shift lever 40 can perform the shift operation to the position N.

In this way, in the shift lever apparatus 10 of the present invention, the restricting portion 76 of the detent hole 70, or the shift lock plate 102 restricts the shift operation of the shift lever 40 through the detent protrusions 66.

In a state in which the detent protrusions 66 remain moved upwardly, when the shift operation of the shift lever 40 is performed from the position N to the position P and vise versa, the detent protrusions 66 abut the restricting portion 76. At this time, the force, by which the detent protrusions 66 are abutted against the restricting portion 76, corresponds to an external force such as a pressing force or the like when the vehicle driver rotates the shift lever 40, the detent protrusions 66 are thereby subject to an impact corresponding to this force from the restricting portion 76. Here, in the shift lever apparatus 10 of the present invention, as is shown in FIG. 1, although the detent protrusions 66 and the detent rod 60 are molded from a synthetic resin so as to be integrated with each other, as described above, each of the detent protrusions 66 has a predetermined configuration whose cross section is the greatest at the portion of the detent protrusion 66 connected to the detent rod 60 so that a high degree of strength against shearing and bending is ensured and thereby an impact applied thereto when the detent rod 60 abuts the restricting portion 76 can be withstood.

Thus, in the shift lever apparatus 10 of the present invention, even if the detent protrusions 66 and the detent rod 60 are molded from a synthetic resin so as to be integrated with each other, the detent protrusions 66 ensure strength against shearing and bending thus enabling the impact when the detent rod 60 abuts the restricting portion 76 to be withstood. Accordingly, as compared to a conventional shift lever apparatus which is structured by welding detent pins to a detent rod, the detent rod 60 and the detent protrusions 66 can be made more compact so that the shift lever apparatus 10 can be made more compact.

As is shown in FIG. 2, in the present embodiment, although the connecting portion 46 is molded from a synthetic resin so as to be integrated with the lever body 42 of the shift lever 40, since the connecting portion 46 is formed into a triangular (divergent) configuration whose width gradually becomes larger toward the bottom of the triangle when viewed from the front, portions of the connecting portion 46 adjacent to the shafts 56 are of a higher degree of strength. Thus, even if the lever body 42 and the connecting portion 46 are made compact, they are able to withstand the stress involved in the shift operation. As a result, in accordance with the present embodiment, the whole body of the shift lever 40 can be made compact thus enabling the shift lever apparatus 10 to be made more compact.

What is claimed is:

1. A shift lever apparatus comprising a lever body having an upper end and a lower end which selects an arbitrary shift range from a plurality of shift ranges set on a vehicle transmission and changes into the selected shift range due to a rotational operation of a shift lever connected to said vehicle transmission, further comprising:
   a detent rod comprising a integrated body extending from the upper end of the shift lever body to the lower end of the shift lever body and which is displaced in the rotating direction of said shift lever in accordance with said rotational operation of the shift lever, the detent rod being disposed inside said shift lever so as to be able to perform a reciprocating motion relative to said shift lever, and which is urged in one direction of said reciprocating motion;
   a detent portion integrally formed with said detent rod and extending along an axis transverse to said detent rod so as to protrude outwardly from said shift lever; and
   a detent means which is formed so as to face said detent portion in a direction in which said detent portion moves in accordance with the rotational operation of said shift lever, and which restricts said rotational operation of said shift lever indirectly by engaging with said detent portion when said rotational operation of said shift lever from a predetermined shift position is performed, and such that movement of said detent rod in opposition to an urging force thereof can release the state in which said rotational operation of said shift lever has been restricted,
   wherein said integrally formed detent portion has an axial cross section which decreases in the direction from a position where the detent portion is integrally formed with the detent rod to a free end of the detent portion.

2. A shift lever apparatus according to claim 1, wherein said detent rod and said detent portion are formed from a synthetic resin.

3. A shift lever apparatus according to claim 1, wherein said shift lever includes:
   a lever body which is integrally molded from a synthetic resin and accommodates therein said detent rod; and
   a connecting portion which is molded from said synthetic resin so as to be integrated with said lever body and is supported by supporting members disposed beside the connecting portion, so as to be rotatable, and whose cross section in the direction of the rotational axis thereof is larger than that of said lever body in the same direction thereof.

4. A shift lever apparatus according to claim 1, wherein the detent portion has a trapezoidal shape which tapers towards the free end of the detent portion.

5. A shift lever apparatus according to claim 4, wherein said shift lever includes:
   a lever body which is integrally molded from a synthetic resin and accommodates therein said detent rod; and
   a connecting portion which is molded from said synthetic resin so as to be integrated with said lever body and is supported by supporting members disposed beside the connecting portion, so as to be rotatable, and whose cross section in the direction of the rotational axis thereof is larger than that of said lever body in the same direction thereof.

6. A shift lever apparatus according to claim 4, wherein said detent rod and said detent portion are formed from a synthetic resin.

* * * * *